(12) United States Patent
Eklund et al.

(10) Patent No.: US 8,793,055 B2
(45) Date of Patent: Jul. 29, 2014

(54) METHOD FOR PROVIDING AN OPERATOR OF A WORK MACHINE WITH OPERATION INSTRUCTIONS AND A COMPUTER PROGRAM FOR IMPLEMENTING THE METHOD

(75) Inventors: Maria Eklund, Örebro (SE); Jonny Lindblom, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 787 days.

(21) Appl. No.: 12/668,896

(22) PCT Filed: Jul. 4, 2008

(86) PCT No.: PCT/SE2008/000428
§ 371 (c)(1),
(2), (4) Date: Jan. 28, 2010

(87) PCT Pub. No.: WO2009/011630
PCT Pub. Date: Jan. 22, 2009

(65) Prior Publication Data
US 2010/0198466 A1 Aug. 5, 2010

(30) Foreign Application Priority Data

Jul. 13, 2007 (SE) .................... 0701732

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC .............................. 701/50; 701/1

(58) Field of Classification Search
USPC ............................................. 701/50
See application file for complete search history.

(56) References Cited

U.S. PATENT DOCUMENTS

| 4,150,497 | A | * | 4/1979 | Weber .............................. 434/71 |
| 4,478,407 | A | * | 10/1984 | Manabe .......................... 472/60 |
| 4,818,107 | A | * | 4/1989 | Ono et al. ....................... 356/622 |
| 4,919,222 | A | * | 4/1990 | Kyrtsos et al. ................. 177/139 |
| 5,034,892 | A | * | 7/1991 | Saotome ......................... 701/50 |
| 5,067,572 | A | * | 11/1991 | Kyrtsos et al. ................. 177/139 |
| 5,088,020 | A | * | 2/1992 | Nishida et al. .................. 700/40 |
| 5,147,172 | A | * | 9/1992 | Hosseini ........................ 414/719 |
| 5,188,502 | A | * | 2/1993 | Tonsor et al. ................... 414/700 |
| 5,240,416 | A | * | 8/1993 | Bennington .................... 434/30 |

(Continued)

FOREIGN PATENT DOCUMENTS

| JP | 2004098726 A | 4/2004 |
| WO | 2006131825 A1 | 12/2006 |

OTHER PUBLICATIONS

International Search Report for corresponding International Application PCT/SE2008/000428.

(Continued)

*Primary Examiner* — Bhavesh V Amin
(74) *Attorney, Agent, or Firm* — WRB-IP LLP (57) ABSTRACT

A method is provided for providing an operator of a work machine with operating instructions when the work machine is used in a repeated work cycle. The method includes automatically instructing the operator of the work machine how to operate the work machine in an optimum way with regard to a specific parameter on the basis of characteristics of the specific work cycle.

43 Claims, 8 Drawing Sheets

(56) References Cited

U.S. PATENT DOCUMENTS

| | | | |
|---|---|---|---|
| 5,274,557 A * | 12/1993 | Moriya et al. | 701/50 |
| 5,446,672 A * | 8/1995 | Boldys | 700/174 |
| 5,446,980 A * | 9/1995 | Rocke | 37/348 |
| 5,471,391 A * | 11/1995 | Gudat et al. | 701/50 |
| 5,493,798 A * | 2/1996 | Rocke et al. | 37/348 |
| 5,513,491 A * | 5/1996 | Broenner et al. | 60/413 |
| 5,520,499 A * | 5/1996 | Ufheil et al. | 414/685 |
| 5,629,849 A * | 5/1997 | Ahn | 701/50 |
| 5,721,679 A * | 2/1998 | Monson | 701/50 |
| 5,815,826 A * | 9/1998 | Henderson et al. | 701/50 |
| 5,832,730 A * | 11/1998 | Mizui | 60/469 |
| 5,890,870 A * | 4/1999 | Berger et al. | 414/699 |
| 5,908,458 A * | 6/1999 | Rowe et al. | 701/50 |
| 5,913,917 A | 6/1999 | Murphy | |
| 5,924,493 A * | 7/1999 | Hartman et al. | 172/4.5 |
| 5,944,764 A * | 8/1999 | Henderson et al. | 701/50 |
| 5,955,706 A * | 9/1999 | Fonkalsrud et al. | 177/136 |
| 5,964,298 A * | 10/1999 | Greenspun | 172/4.5 |
| 5,996,703 A * | 12/1999 | Yamamoto et al. | 172/4.5 |
| 6,062,317 A * | 5/2000 | Gharsalli et al. | 172/2 |
| 6,064,933 A * | 5/2000 | Rocke | 701/50 |
| 6,076,030 A * | 6/2000 | Rowe | 701/50 |
| 6,114,993 A * | 9/2000 | Henderson et al. | 342/357.27 |
| 6,286,606 B1 * | 9/2001 | Krieg et al. | 172/4.5 |
| 6,349,252 B1 * | 2/2002 | Imanishi et al. | 701/50 |
| 6,363,632 B1 * | 4/2002 | Stentz et al. | 37/414 |
| 6,435,875 B1 * | 8/2002 | Karussi | 434/29 |
| 6,701,239 B2 * | 3/2004 | Keefer | 701/50 |
| 6,751,540 B2 * | 6/2004 | Keefer et al. | 701/50 |
| 6,917,846 B1 * | 7/2005 | Muller | 700/108 |
| 7,113,105 B2 * | 9/2006 | Sahm et al. | 340/679 |
| 7,633,021 B2 * | 12/2009 | Pfohl et al. | 177/141 |
| 8,024,095 B2 * | 9/2011 | Mintah et al. | 701/50 |
| 2004/0068352 A1 * | 4/2004 | Anderson | 701/25 |
| 2004/0158355 A1 | 8/2004 | Holmqvist et al. | |
| 2005/0055157 A1 | 3/2005 | Scholl | |
| 2006/0136110 A1 | 6/2006 | Casey et al. | |
| 2007/0005237 A1 | 1/2007 | Needham et al. | |
| 2007/0076136 A1 | 4/2007 | Matsuda et al. | |

OTHER PUBLICATIONS

International Preliminary Report on Patentability for corresponding International Application PCT/SE2008/000428.

* cited by examiner

METHOD FOR PROVIDING AN OPERATOR OF A WORK MACHINE WITH OPERATION INSTRUCTIONS AND A COMPUTER PROGRAM FOR IMPLEMENTING THE METHOD

BACKGROUND AND SUMMARY

The present invention relates to a method for providing an operator of a work machine with operating instructions.

The term "work machine" comprises different types of material handling vehicles like construction machines, such as a wheel loader and a dump truck (such as an articulated hauler). A work machine is provided with a bucket, container or other type of work implement for carrying/transporting a load. Further terms frequently used for work machines are "earth-moving machinery", "off-road work machines" and "construction equipment".

In connection with transportation of heavy loads, e.g. in contracting work, work machines are frequently used. A work machine may be operated with large and heavy loads in areas where there are no roads, for example for transports in connection with road or tunnel building, sand pits, mines and similar environments.

A work machine is often used in a repeated work cycle. The term "work cycle" comprises a route of the work machine (ie the work cycle travel path) and a movement of a work implement, such as a bucket, (lifting/lowering operation). Thus, the travel path defines a movement of the work machine between two destinations at a distance from each other. The work cycle is repeated in the same geographical area. During the performance of the work cycle, the work machine often encounters different gradients of the ground (uphill and downhill), ground conditions and turns (cornering).

According to a first work cycle example, a wheel loader typically drives into a heap of material, lifts the bucket, reverses out of the heap, turns and is forwarded towards a dump truck where it unloads the material onto the container of the dump truck. After unloading, the wheel loader returns to the starting position.

A second work cycle example for a wheel loader is the so called "load & carry cycle" with a small ramp at the end. According to this example, material is collected in the bucket, the wheel loader is reversed, turned and forwarded a longer distance (100-400 meters) to a crusher or conveyor belt, which is located on top of the ramp, and the bucket is emptied. The wheel loader is thereafter driven back again.

According to a third work cycle example, a dump truck is loaded at a first position, driven along a varied route, unloaded at a second position and driven back along the varied route. Normally, an excavator or wheel loader loads the container of the dump truck at the first position.

The invention will be described below for a wheel loader. This should be regarded as a non-limiting example of a work machine. The wheel loader comprises a powertrain for propelling the machine via the wheels. A power source, such as an internal combustion engine, and especially a diesel engine, is adapted to provide the power for propelling the wheel loader. The wheel loader further comprises a hydraulic system for performing certain work functions, such as lifting and tilting a work implement and steering the machine. The power source is also adapted to provide the power for controlling the hydraulic work functions. More specifically, one or more hydraulic pumps are driven by the power source in order to provide hydraulic actuators (such as hydraulic cylinders) with pressurized hydraulic fluid.

It is desirable to achieve a method which creates conditions for an improved operation of a work machine operating in a repeated work cycle.

According to an aspect of the present invention, a method is provided for providing an operator of a work machine with operating instructions when the work machine is used in a repeated work cycle, comprising the step of automatically instructing the operator of the work machine how to operate the work machine in an optimum way with regard to a specific parameter on the basis of characteristics of the specific work cycle.

According to a first preferred example, the specific parameter regards vibrations affecting the operator in operation, such as WBV (Whole Body Vibrations).

According to a second preferred example, the specific parameter regards energy consumption (for example fuel consumption).

Preferably, the operation instructions or guidance are presented to the operator in an operator compartment of the vehicle when the operator is in an operational position. Thus, the operator is seated when the instructions are presented to him. In other words, there is an educational interface in the cab. The instruction preferably comprises visual information displayed to the operator. The display means may comprise a separate screen in the instrument panel of the vehicle and/or a head-up display, wherein a virtual image is projected from the instrument panel onto the windscreen. Further, the instruction may comprise audio information, which may be presented via an automated voice.

A suitable time is preferably selected for presenting the instructions to the operator in a safe way. With regard to an articulated hauler, the instructions may be presented during a loading operation. Alternatively, the instructions are presented to the operator shortly before reaching a specific occurrence when performing the work cycle.

The work cycle characteristics may regard a work machine internal characteristic, such as a work machine behaviour or operator behaviour, and/or an external characteristic, such as geographical properties of the work cycle travel path (terrain characteristics). More specifically, the characteristics may comprise a predicted and/or experienced sequence of events (occurrences) that takes place during performance of the work cycle and which is relevant for the control of the work machine.

Therefore, according to a preferred embodiment, the method comprises the step of informing the operator of occurrences along a travel path of the work cycle, which occurrences have an impact on operation of the work machine in an optimum way with regard to said specific parameter, and instructing the operator how to operate the work machine past the positions of the occurrences. For example, the instructions may comprise a favourable route past the occurrence and/or operating instructions with regard to braking and/or acceleration and/or steering.

The occurrences are of such a magnitude that they are relevant for the control of the work machine. Each such occurrence is preferably associated to a position along the work cycle travel path.

According to a preferred embodiment, the operator instruction is based on a change in the ground, such as ground conditions, for example any unevenness in the ground, like a pit or stone. According to the example of vibrations affecting the operator, the operator is preferably instructed of the position of the unevenness and also recommended to drive the work machine around the unevenness.

According to a further preferred embodiment, the operator instruction is based on a change in a work cycle travel path.

Preferably, operator instruction is based on a change of direction of a work cycle travel path in a horizontal plane and/or on a change of ground inclination of a work cycle travel path. According to the example of fuel consumption, the operator may be instructed of the position of the work cycle travel path and also recommended an advantageous gear sequence and/or gas pedal operation and/or brake operation past the work cycle travel path change.

Thus, knowledge of the work cycle creates conditions for reliably predicting forthcoming events (occurrences) in the work cycle and instructing the operator correspondingly for operating the work machine in an efficient way. Such work cycle knowledge may be achieved either from a previously performed lap of the specific work cycle and/or from pre-available information of the work cycle, such as topographical maps.

Preferably, the method comprises the step of repeatedly detecting at least one machine operational parameter during performing a work cycle lap, such as in the hydraulic system and/or the drive train.

Thus, an event may be established on the basis of the detected operational parameter in a previously performed work cycle lap and used for instructing an operator of a work machine how to operate it in a later performed work cycle. More particularly, an individual operator may learn from past experiences. For example, driving patterns with regard to steering wheel deflection, gas pedal operation, brake pedal operation, work implement operation etc are recognized and stored. Further, operational characteristics recorded from one work machine may be distributed to other participants in a fleet operating the specific work cycle.

According to an alternative, or complementary embodiment, the method comprises the step of receiving pre-available information of the work cycle in question.

Such information may be formed by geographical maps of the area covering the work cycle travel path, knowledge of the specific work cycle travel path (comprising curves, ascending sections and descending sections), the material to be transported, ground conditions, weather conditions etc. For example, a global navigation satellite system (GNSS) (such as the GPS) may be used for establishing the work cycle travel path.

According to one example, the operator instruction is established on the basis of both detected operational parameters while performing the work cycle and available information of the work cycle in question. Thus, the work cycle route may be produced in a topographical map, wherein turns and slopes are defined. The operator instruction is based on such a topographical map and it may be modified based on detected operational conditions. Thus, the map may be continuously updated depending on the current state of the travel path. In this way, the instructions may be quickly updated depending on different days, time of the day etc.

According to a further preferred embodiment, the method comprises the step of predicting an effect of the characteristics of the specific work cycle on the specific parameter and instructing the operator in response to the predicted effect. The instructions may comprise information regarding which type of characteristics (such as a bumpiness level) that is identified. The instructions may further comprise an explanation of the reason why the characteristics has a negative impact on the specific parameter. The instructions may further comprise concrete advice how to operate the work machine in an optimum way past a portion of a travel path of the work cycle, which is associated to the specific characteristics. The concrete advice may comprise advice to slow down the work machine and/or to alter the course of the work machine. In this way, the instruction does not only serve to be informational, but also educational.

According to a further preferred embodiment, the method comprises the step of instructing the operator of the predicted effect on the specific parameter along a travel path of the work cycle ahead of the work machine. The operator is preferably instructed of the predicted effect on the specific parameter (such as vibrations) just before entering a travel path portion with said characteristics. In this way, the operator is informed at an advantageous point in time (just before the specific travel path portion with said characteristics) in order to handle the machine efficiently.

It is also desirable to achieve a method which creates conditions for an improved operation of a work machine.

Other advantageous features and functions of various embodiments of the invention are set forth in the following description.

BRIEF DESCRIPTION OF THE DRAWINGS

The invention will be explained below, with reference to the embodiments shown on the appended drawings, wherein FIG. 1 schematically shows a wheel loader in a side view, FIG. 2 schematically shows a conventional powertrain, a conventional hydraulic system and an exemplary embodiment of control system of the wheel loader in FIG. 1.

DETAILED DESCRIPTION

Figure 1:
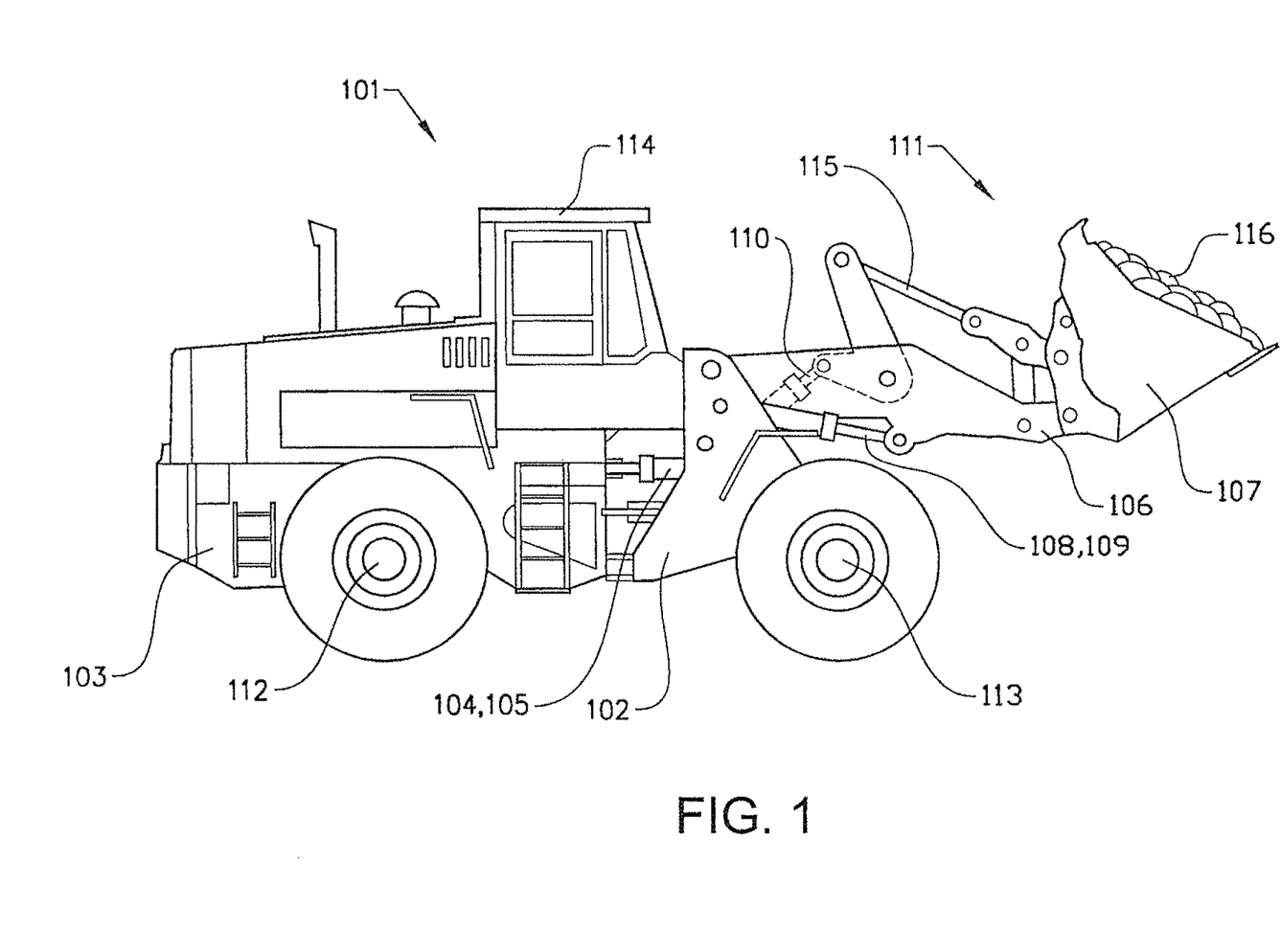

FIG. 1 shows a frame-steered work machine constituting a wheel loader 101. The body of the wheel loader 101 comprises a front body section 102 and a rear body section 103, which sections each has an axle 112,113 for driving a pair of wheels. The rear body section 103 comprises a cab 114. The body sections 102,103 are connected to each other in such a way that they can pivot in relation to each other around a vertical axis by means of two first actuators in the form of hydraulic cylinders 104,105 arranged between the two sections. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106 and an implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

Figure 2:
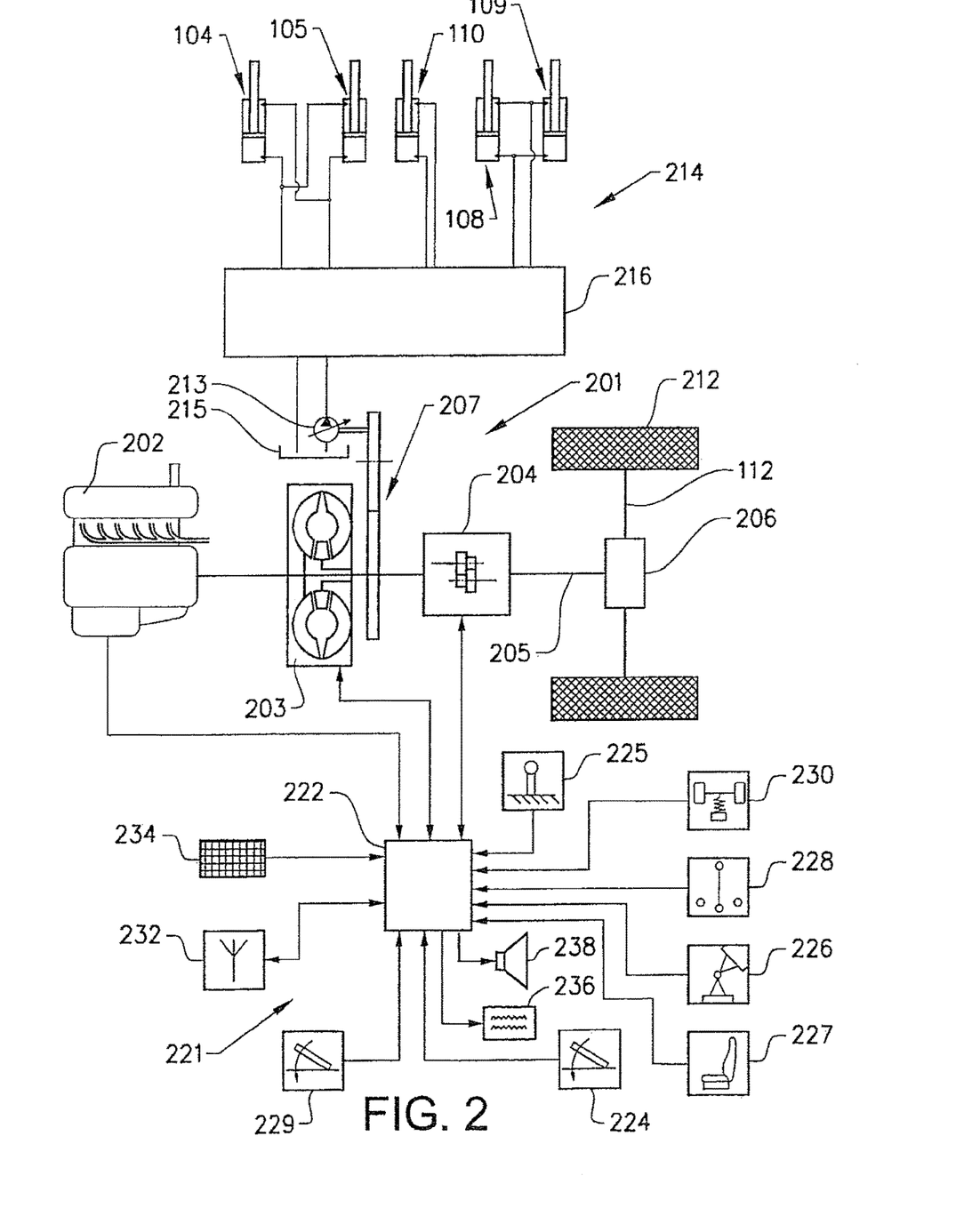

FIG. 2 schematically shows a conventional powertrain 201 and a conventional hydraulic system 214. The powertrain 201 comprises a power source 202 (prime mover) in the form of an internal combustion engine and a transmission for transmitting power from the engine 202 to the wheels 212 for propelling the wheel loader. The engine 202 is preferably a diesel engine. The powertrain 201 is of a mechanical type and comprises from the engine 202 to the wheels 212 the following: a transmission unit 203, in the form of a torque converter, a gearbox 204, a cardan shaft 205, a differential gear 206 and transverse half shafts 112. The gearbox is adapted for varying the speed of the vehicle, and for changing between forward and backward driving direction of the wheel loader 101.

The torque converter 203 is able to increase the torque, which means that the output torque of the torque converter can be for example in the interval 1-3 times the torque of the internal combustion engine 202. Furthermore, the torque converter has preferably a free wheel function and a lock-up function for direct operation without any increased torque. Thus, the transmission ratio of the torque converter in the lockup state is fixed, and preferably substantially 1:1. However, in an alternative embodiment the transmission unit 203 could be an ordinary clutch for disengagement or direct operation without any increased torque. Such a clutch could be a hydraulic clutch as well as a mechanical clutch, such as a variably controlled friction slip clutch.

The engine 202 is adapted to provide a motive power for propelling the vehicle and to operatively drive at least one variable displacement pump 213 in the hydraulic system 214 for lifting operations and steering the wheel loader 101. The hydraulic pump 213 is driven by the internal combustion engine 202, preferably via gear wheels 207 arranged between the torque converter 203 and the gearbox 204.

The pump 213 is configured for delivering pressurized hydraulic fluid from a tank 215 to the cylinders 104,105,108, 109,110. A number of electronically controlled valve units are hydraulically connected between the pump 213 and the cylinders 104,105,108, 109,110 for regulating the reciprocating work of the cylinders. The system of hydraulic valve units is, for ease of presentation, represented by a single box 216.

FIG. 2 further shows a first exemplary embodiment of a control system 221 for controlling the flow of information in the wheel loader 101. The control system 221 comprises a control unit 222 with software for handling said information.

The control unit 222 is commonly known as a central processing unit (CPU) or an electronic control module (ECM) for an electronic control of the vehicle operation. In a preferred embodiment, the control unit comprises a microprocessor. The control unit 222 comprises a memory, which in turn comprises a computer program with computer program segments, or a program code, for implementing the control method when the program is run. This computer program can be transmitted to the control unit in various ways via a transmission signal, for example by downloading from another computer, via wire and/or wirelessly, or by installation in a memory circuit. In particular, the transmission signal can be transmitted via the Internet.

The control system 221 comprises a sensor (not shown) for detection of a speed of the vehicle. The sensor can consist of or comprise a magnetic pick-up device that detects the movement of a gear tooth in the gearbox 204, as the speed of rotation of the gear tooth corresponds to the speed of the engine. The sensor is arranged to generate a signal with this information to the control unit 222. The control unit 222 receives signals from said sensor.

The control unit 222 receives information of operator input (ie operator behaviour) from different sensors. The control unit 222 receives information concerning the required speed of the engine from a sensor 224, which detects the position of a throttle pedal and generates a signal with information about the position of the throttle pedal to the control unit 222. The engine speed is thus increased with increased depression of the throttle pedal. Similarly, the control unit 222 receives information from a gear selector 225 and a brake pedal sensor 229.

The control system comprises means 226,227,228,230, 232,234 for determining at least one condition that is indicative of occurrences which have an impact on operation of the work machine in an optimum way with regard to a specific parameter.

A steering angle sensor 226 is adapted to detect the steering angle of the vehicle, ie the inclination between the two vehicle parts 102,103 with regard to a vertical axis and generates a corresponding signal for input to the controller 222. Such a sensor may be constituted by a linear sensor arranged for detecting an extension of one of said steering cylinders 104, 105, or a rotary sensor positioned at the steering joint. Thus, the sensor 226 is adapted to detect a change of direction of the travel path in a horizontal plane. Alternatively, the steering angle sensor may be adapted for detecting a turning amount of a steering wheel or deflection of a steering lever.

An inclination sensor 228 determines the inclination of the horizontal longitudinal axis of the work machine and generates a corresponding signal for input to the controller 222. Thus, the inclination sensor 228 is adapted to detect a ground inclination of the travel path. According to an alternative, an accelerometer system may be used for determining inclination, for example comprising two uniaxial accelerometers, or a single dualaxial accelerometer.

A weight sensor 230 is adapted to determine a weight of the load 116 in the bucket 107. The weight sensor is here constituted by an axle load sensor 230 adapted to detect a loading condition of the work machine and generates a corresponding signal for input to the controller 222. It is possible to replace the axle load sensor with wheel load sensors associated with the individual wheels. According to a further alternative, the weight of the load 116 may be determined by detecting a pressure in the hydraulic system 214.

A sensor 227 is adapted to determine the operator position as a function of time, ie any vibrations of the operator seat are detected.

The sensors mentioned above are known per se to a man skilled in the art so their structure need not be explained here.

Figure 3:
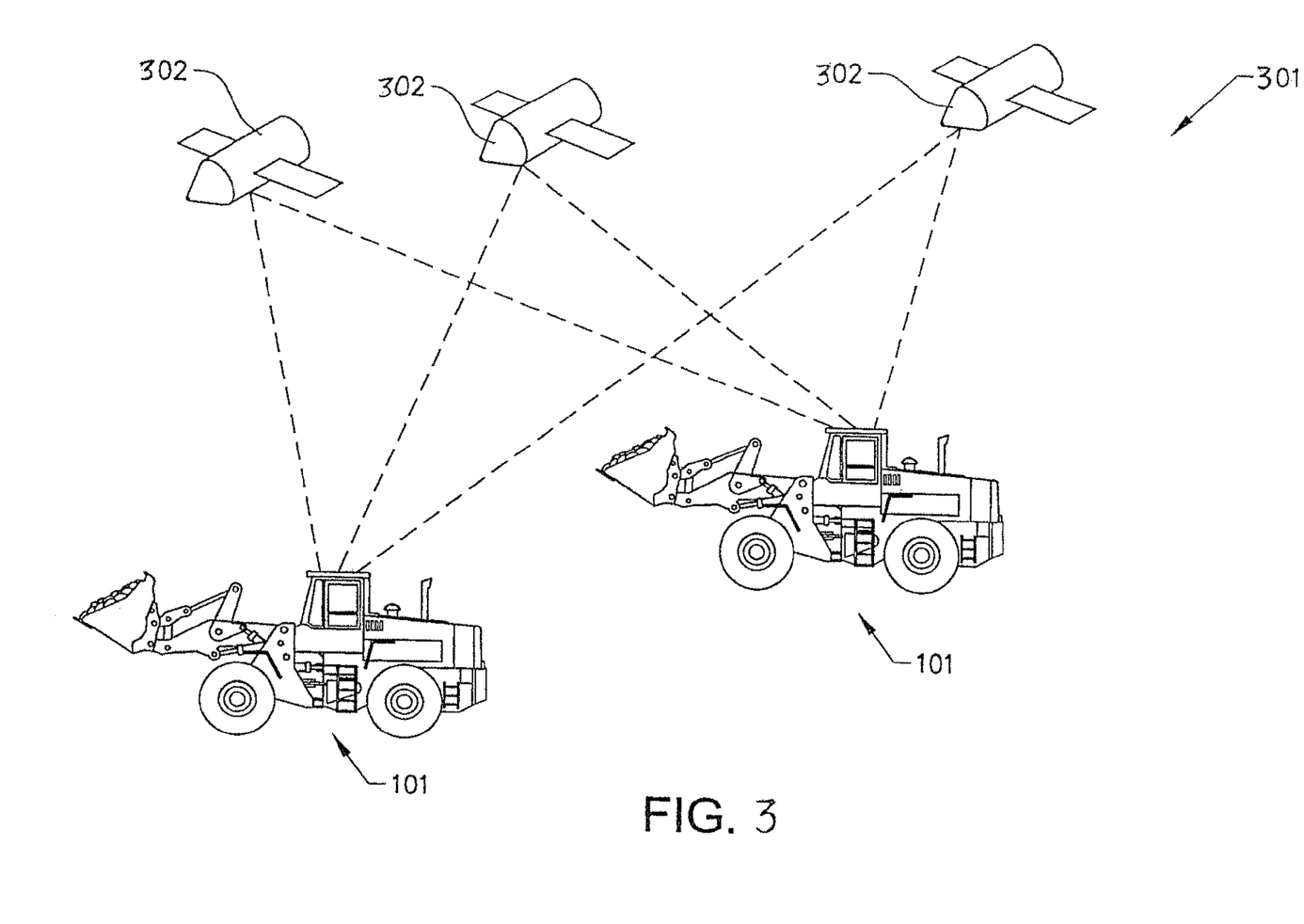
FIG. 3 illustrates a satellite based system for monitoring a fleet of wheel loaders.

The control system 221 further comprises a means 232 for establishing a position of the working machine 101. The positioning means 232 forms a vehicle location sensor and is constituted by an antenna and is adapted to communicate with external means, such as satellites 302, see FIG. 3, for establishing the work machine position. The control system 221 uses a global navigation satellite system 301 such as the GPS, GLONASS, or Gallileo. According to an alternative to GPS, the position is determined via stationary radio buoys, preferably via a triangulation procedure.

The control system 221 further comprises a geographical map means 234, such as a map data base. The map database 234 may comprise topographic information such as the elevation associated with each of the nodes on the work cycle route. According to a first example, the topographic information is accurate enough for identifying individual bumpy occurrences, such as holes or stones, in the travel path, which may cause vibrations effecting an operator of the work machine. According to a second example, the topographic information is accurate enough for identifying a bumpy area (see reference numeral 506 in FIG. 5) comprising a plurality of individual bumpy occurrences, such as holes or stones, in the travel path, which may cause vibrations effecting an operator of the work machine.

The control unit is adapted to process the received information and determine operating instructions. The operating instructions are presented to the operator in the cab visually via a screen 236 and/or in the form of sounds via a loud speaker 238.

During a first lap of the load carrying work cycle, a plurality of operational parameters are detected and recorded. Preferably, each detected operational parameter is indicative of a work machine behaviour. More specifically, any turns are detected by means of the steering angle sensor 226. Any change of ground inclination is detected by means of the inclination sensor 228. Each of the detected operational parameters forms an input signal and is sent to the control unit 222 and recorded in the memory of the control unit 222.

Further, the geographical position of the wheel loader is detected and associated to each of the detected events by means of the navigation system. Thus, the work cycle route is represented by a path on a geographical map.

The operating instructions are established on the basis of the operational parameter information in the input signals. More specifically, each detected operational parameter information is analyzed and if it is deemed to be of such a magnitude that it substantially effects the parameter to be optimized, it is represented by a control event in the sequence of events. In other words, a model, or map, is built of the work cycle comprising information of a plurality of events, each linked to geographical position.

Figure 4:
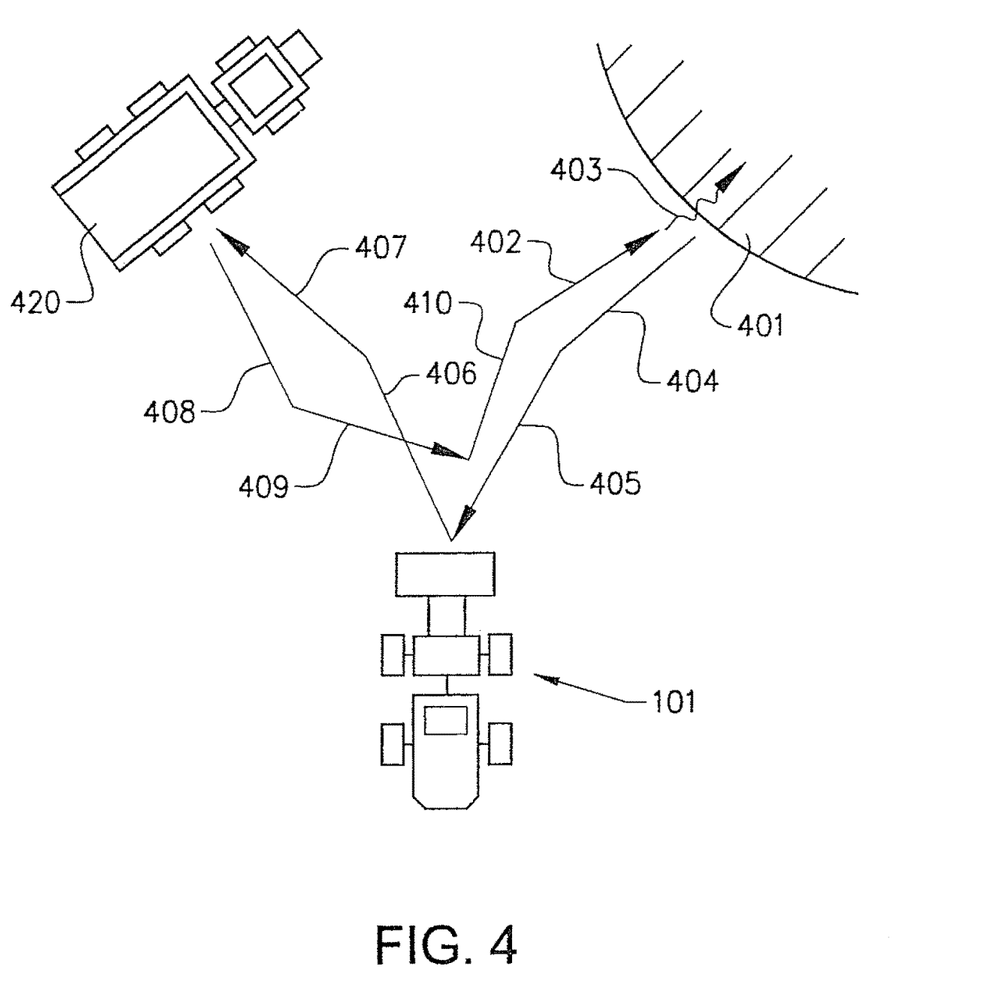
FIG. 4 illustrates a short cycle loading with the wheel loader in a view from above.

With reference to FIG. 4, a work cycle in the form of so-called short-cycle loading for the wheel loader 101 is shown. The short-cycle loading is characterized in that the longest distance that the vehicle travels between a loading and an unloading position does not exceed a certain number of meters, in this case of the order of 15 meters. More specifically, the wheel loader 101 is used to scoop up material from the loading position (excavating a natural ground 401) with the bucket 107 and unload it in the unloading position (onto a container of a dump truck 420 in the form of an articulated hauler).

FIG. 4 shows a driving pattern comprising a series of steps from excavation to loading onto the dump truck 420. Specifically, the wheel loader 101 travels forward, see arrow 402, to the natural ground 401 in for example a forward second speed gear. The wheel loader is in a straight position, wherein the front and rear vehicle parts are in line. When it approaches the natural ground 401, it thrusts into the natural ground in for example a forward first speed gear in order to increase tractive force, see arrow 403. The lifting arm unit is raised, wherein the bucket 107 is filled with material from the natural ground.

When the excavation is finished, the wheel loader 101 is retreated from the excavating operation position at a high speed in for example a reverse second speed gear, see arrow 404 and the wheel loader is turned to the right (or to the left), see arrow 405. The wheel loader 101 then moves forward, see arrow 406, while turning hard to the left (or right), then straightens out the vehicle to travel to approach the dump truck 420 at a high speed, see arrow 407. The lifting arm unit 106 is raised, the bucket 107 tilted and the material is deposited on the container of the articulated hauler. When a loading operation of the dump truck 420 is finished, the wheel loader 101 moves away in reverse from the dump truck 420 at a high speed, see arrow 408, turns to a stop position and is driven forwards again 410 towards the natural ground 401.

Figure 5:
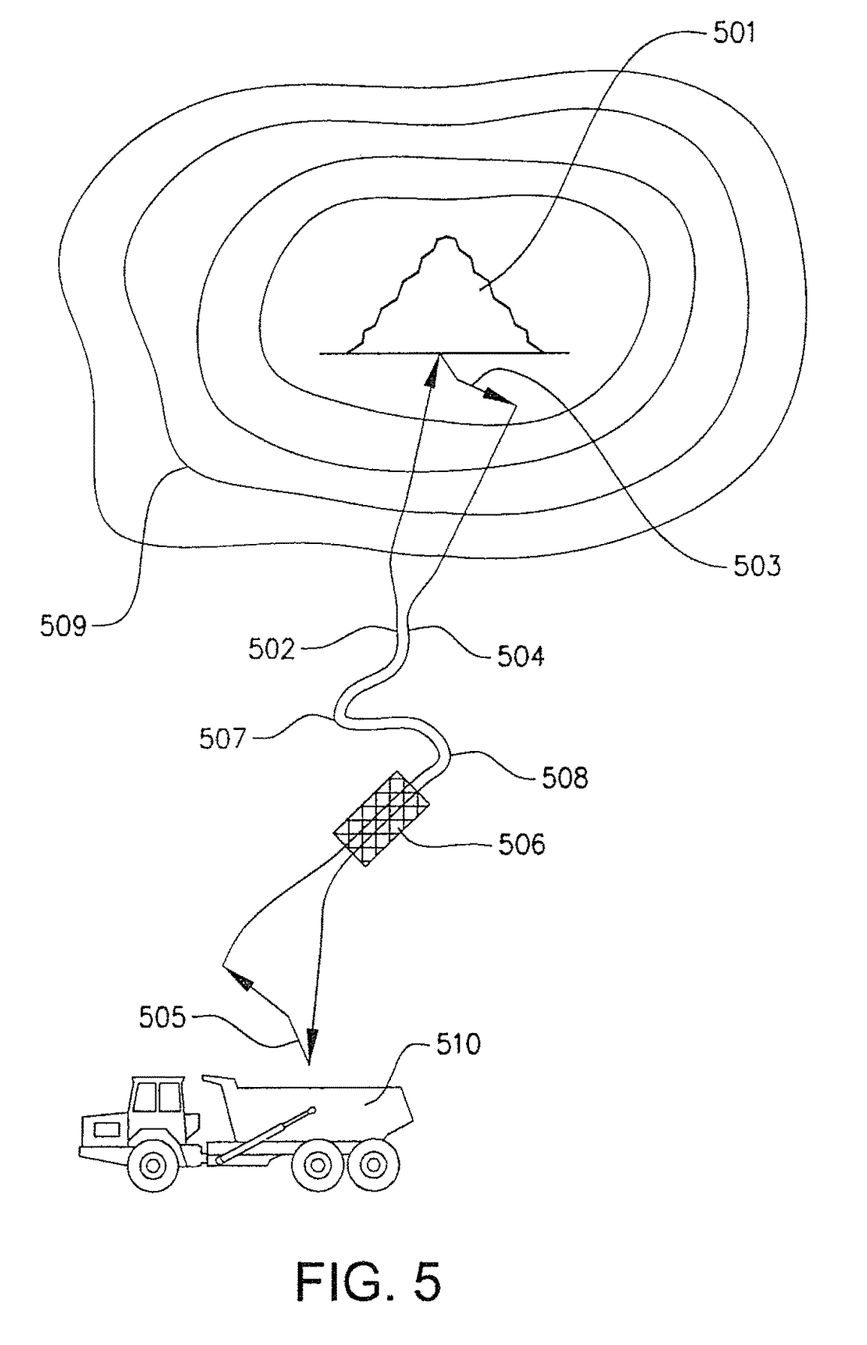
FIG. 5 illustrates a work cycle route in a view from above for the wheel loader.

With reference to FIG. 5, a work cycle in the form of so-called load carrying for the wheel loader 101 is shown. The load carrying is characterized in that the longest distance that the vehicle travels between the loading and the unloading position is within a predetermined range, in this case 15-75 meters.

The arrows indicated by reference numerals 502-505 in FIG. 5 relate to four vehicle movements, namely forwards 502 towards and interaction with the material (gravel or stone) 501 that is intended to be moved, backwards with the material in the bucket 503, forwards again 504 to the unloading position 510 (here in the form of an articulated hauler) where the material is intended to be placed, and thereafter backwards 505 to the initial position.

Figure 6:
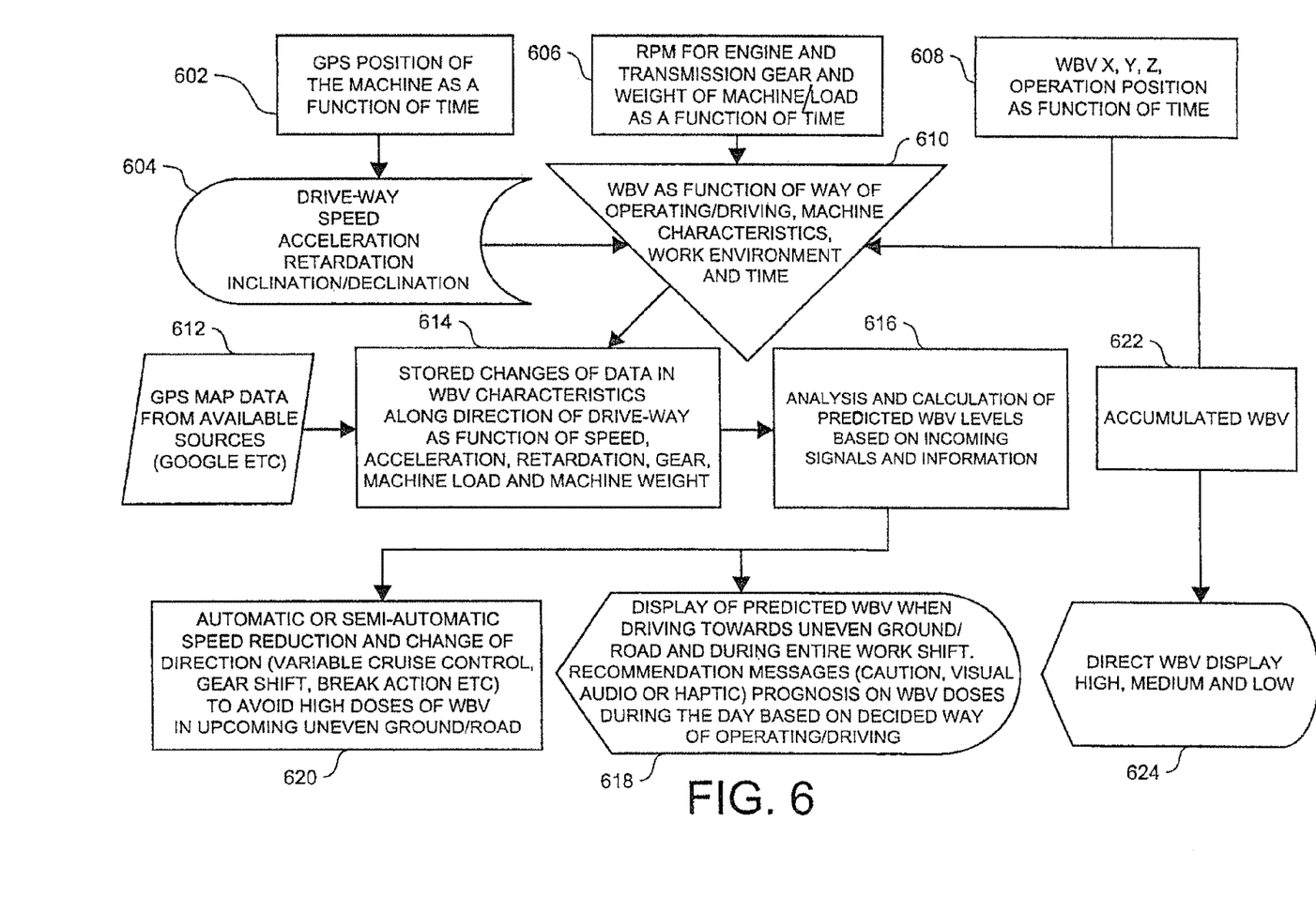
FIG. 6-8 show three examples of a flow chart for an operator instruction method.

The wheel loader experiences two turns 507, 508 on its route between the loading position and the unloading position. Further, it passes an area 506 of bumpy ground resulting in an increased level of vibrations affecting the operator. Further, the contour lines 509 indicate a hill, which the wheel loader has to ascend for reaching the loading position 501 and descend in order to reach the unloading position. FIG. 6 illustrates a flow chart with regard to Whole Body Vibrations (WBV) according to a first example. In block 602, a position of the work machine is determined via GPS as a function of time from start of a work cycle lap. The flow chart continues to block 604, where a work machine speed and acceleration/deceleration is continuously recorded. Further, any ground information, such as inclination/declination is recorded. In block 606, an rpm for the engine and possibly the transmission is continuously recorded. Further, a selected gear position and a weight/load is continuously recorded. In block 608, an operator position is continuously recorded. In block 610, a current WBV affecting the operator is calculated on the basis of the information gathered in blocks 604,606,608.

In block 612, a map covering the work cycle travel path is used. In block 614, the changing WBV characteristics from block 610 are associated to positions along the work cycle travel path from block 612. In block 616, the predicted WBV level is calculated based on the information from block 614 and stored information.

In block 618, a predicted WBV level is displayed to the operator. The predicted WBV level may be displayed when driving towards an uneven ground during the next lap of the work cycle. Further, a total WBV level may be predicted for the complete work cycle or for an entire work shift. This total WBV level may be displayed to the operator before starting a further work cycle lap or before starting a work shift. Further, recommendation messages (caution, visual, audio or haptic) are presented to the operator how to operate the work machine in a way reducing the WBV.

According to a further development, in block 620 semiautomatic or automatic measures are taken in order to reduce WBV during a lap of the work cycle. Such measures may be taken before an upcoming event, such as uneven ground. Thus, the operation input from the operator is manipulated during operation. For example, such measures may be taken with regard to speed reduction and change of direction (variable cruise control, gear shifts, brake action etc).

According to an alternative route, in block 622 a total accumulated WBV is determined on the basis of input from block 608. In block 624, a current WBV level (such as High, Medium and Low) is directly displayed to the operator.

Figure 7:
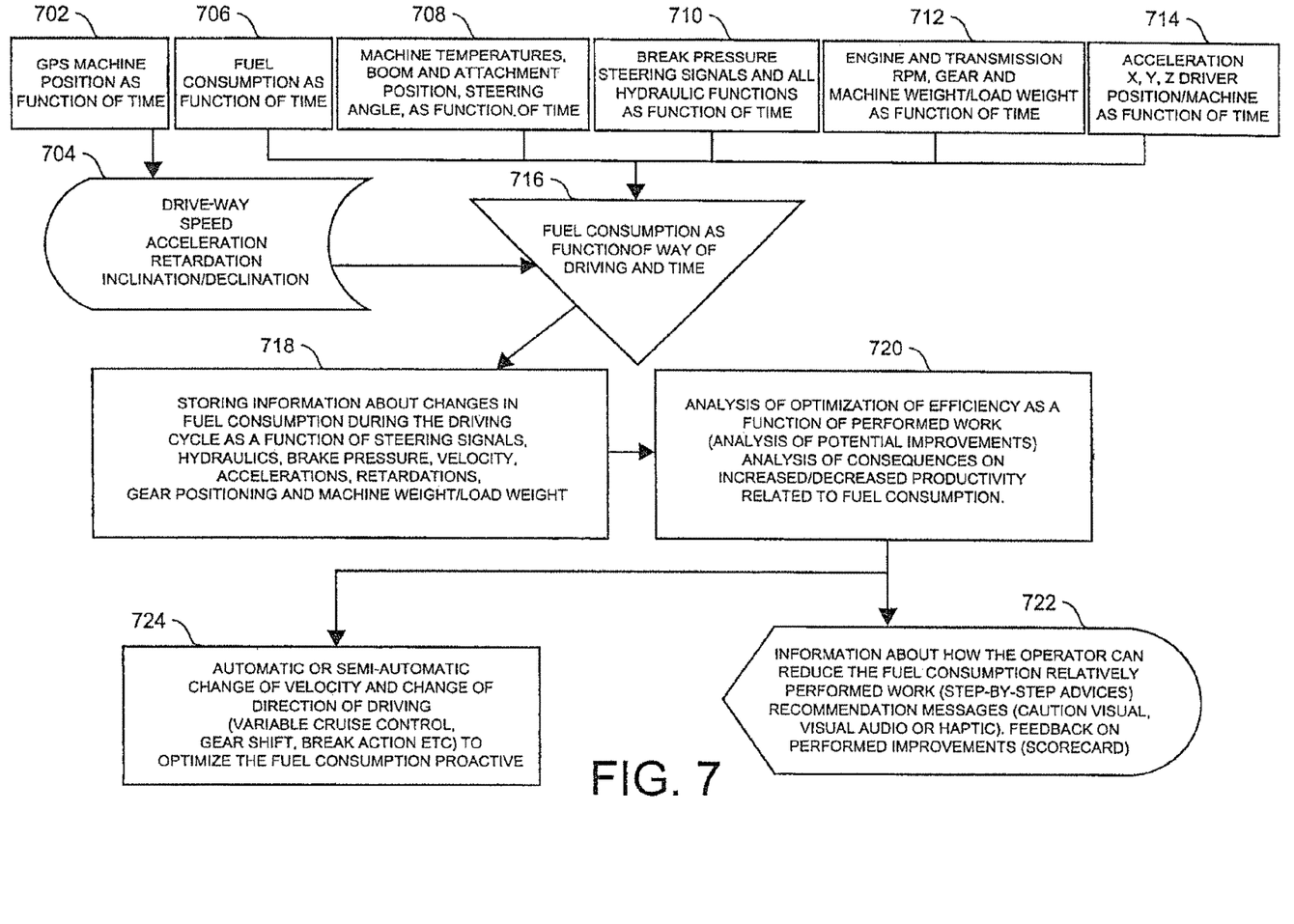

FIG. 7 illustrates a flow chart with regard to fuel consumption according to one example. In block 702, a position of the work machine is determined via GPS as a function of time from start of a work cycle lap. The flow chart continues to block 704, where a work machine speed and acceleration/ deceleration is continuously recorded. Further, any ground information, such as inclination/declination is recorded. In block 706 a fuel consumption as function of time is recorded. In block 708, machine temperatures, boom and attachment position and the steering angle are recorded as function of time. In block 710, brake pressure, steering signals and hydraulic functions are recorded as function of time. In block 712, an rpm for the engine and possibly the transmission is continuously recorded. Further, a selected gear position and a weight/load is continuously recorded. In block 714 an operator position is continuously recorded.

In block 716, the information from the blocks 704,706,708, 710,712,714 is received and a fuel consumption value is calculated as a function of way of driving and the time. The chart continues to block 718, wherein changes in fuel consumption during the work cycle is associated to received signals regarding steering, hydraulic, brake pressure, velocity, acceleration, gear position and machine weight/load weight.

In block 720, the information from the block 718 is received and an analysis of potential improvements in fuel consumption is performed. More specifically, an optimization of the fuel consumption for the work cycle in question is performed. Further, an analysis of consequences with regard to any increased/decreased productivity related to the fuel consumption is performed.

In block 722, information about how the operator can reduce the fuel consumption for the work cycle is displayed to the operator. The information is displayed in step-by-step advices. Further, recommendation messages (caution, visual, audio or haptic) are presented to the operator. Further, the operator receives feedback on performed laps of the work cycles. Preferably any improvements in fuel consumption are pointed out in order to stimulate the operator for further improvements.

According to a further development, in block 724 semi-automatic or automatic measures are taken in order to reduce the fuel consumption during a lap of the work cycle. Thus, the operation input from the operator is manipulated during operation. For example, such measures may be taken with regard to speed reduction and change of direction (variable cruise control, gear shifts, brake action etc) in order to pro-actively improve the fuel consumption.

Further, with regard to energy consumption (for example fuel consumption), the following concrete information advice may be presented to the operator:

The operator is notified where (at which point along the travel path) and/or how (depression of accelerator pedal) the machine should be accelerated. For example, he may be notified via an automatically inflicted vibration of the accelerator pedal. For example, an optimized gas throttle (gas pedal deflection) is notified for example when driving uphill and/or downhill and/or during cornering.

Further, the operator may be notified where (at which point along the travel path) braking and/or gas throttling should commence. For example, he may be notified via an automatically inflicted vibration of the brake pedal and/or accelerator pedal, respectively. Likewise, the operator may be notified of an optimized gas throttle through a specific portion of the travel path with a certain ground condition and/or level of ground engagement (such as when slippery ground).

Further, the operator is notified of a shortest possible travel path and/or a most efficient travel path past a specific occurrence or stretch. For example, he may be notified via an automatically inflicted impulse in the steering wheel/steering member.

In operation of the wheel loader, several systems interact. For example, the engine is adapted to provide power both for propelling the machine via the wheels and to the hydraulic system for performing different work functions. A substantial power is required for operating the work implement, which may lead to that the engine cuts out if the powertrain is loaded simultaneously. It is therefore important to use the different systems in a balanced way with regard to one another.

Therefore, the operator may be notified of information with regard to operating the work implement in an energy efficient way. It may be presented for example on the basis of a specific type of operation, such as log or gravel handling. Further, a work implement operation (such as a bucket filling phase) may be recorded and analyzed with regard to fuel efficiency and recommendations on how to optimize the work implement operation may be presented to the operator. He may be notified via an automatic vibration of an operator controlled element, such as a lift and/or tilt lever.

According to a further example, a plurality of consecutive work implement operations (such as a bucket filling phase) are recorded and it is determined whether they are of the same type or not. If they are determined to be of the same type, the operator is informed of the possibility to use an automatic, or semi-automatic work implement operation.

Figure 8:
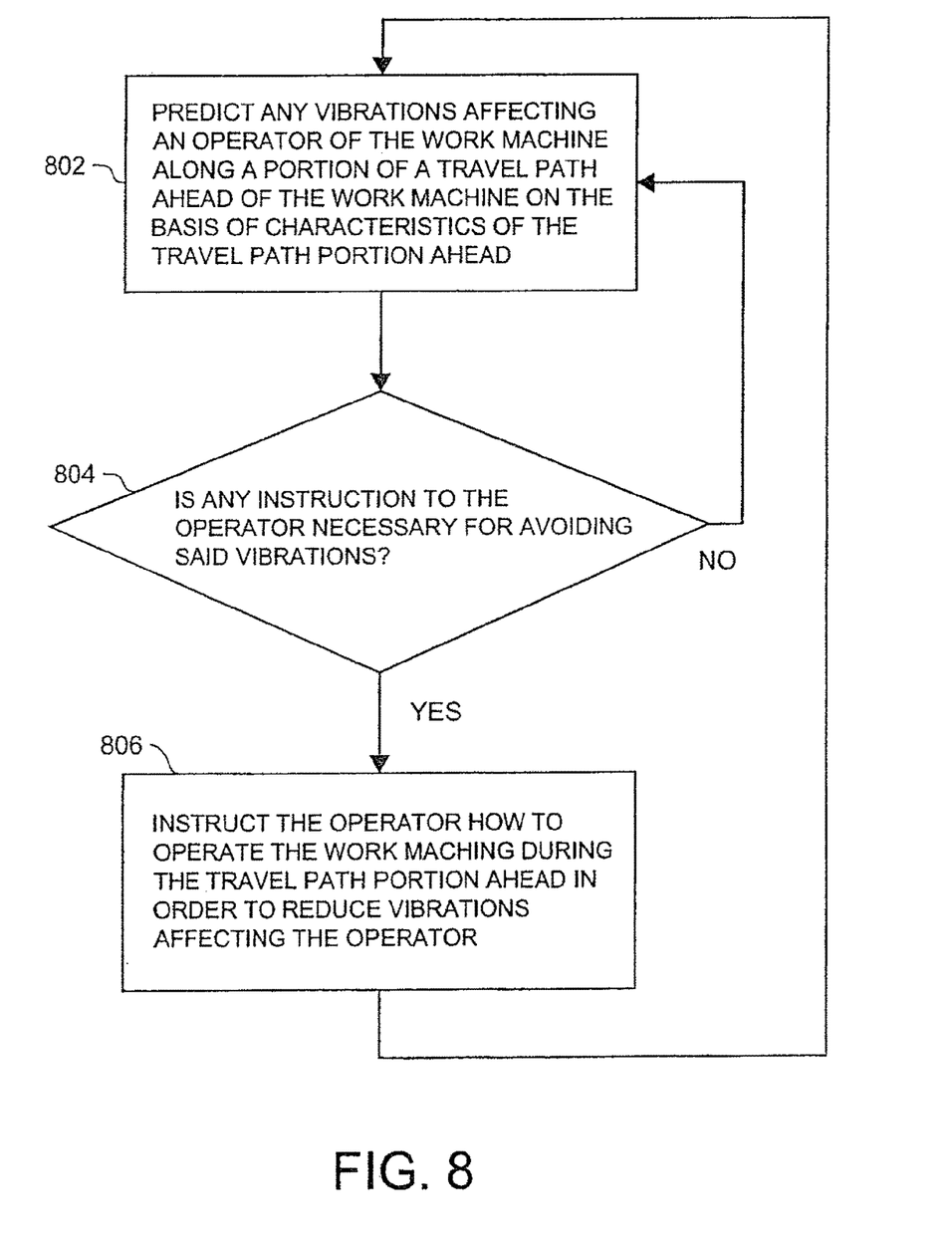

FIG. 8 illustrates a flow chart with regard to Whole Body Vibrations (WBV) according to a second example. In block 802, any vibrations affecting an operator of the work machine along a portion of a travel path ahead of the work machine is predicted on the basis of characteristics of the travel path ahead. The characteristics of the travel path ahead may be received from pre-available maps. Such pre-available maps may for example be received from a base station of a work site or directly down-loaded from the internet. Especially, the characteristics of the travel path may comprise information with regard to turns of the travel path, inclination changes of the travel path, any bumpy areas and/or any individual bumpy occurrences etc.

In block 804, it is determined whether any instruction to the operator is necessary for avoiding said vibrations. If such instructions is determined to be necessary, in block 806, the operator is instructed how to operate the work machine during the travel path portion ahead in order to reduce the vibrations actually affecting the operator.

If such instruction is determined not to be necessary in block 804, the flow chart starts again in block 802 and predicts any vibrations affecting an operator of the work machine along a next portion of the travel path ahead of the work machine.

After having instructed the operator in block 806, the flow chart starts again in block 802 and predicts any vibrations affecting an operator of the work machine along a next portion of the travel path ahead of the work machine.

Thus, the prediction is continuously updated with regard to a specific portion of the travel path ahead of the work machine while the work machine is forwarded along the travel path.

Several laps of the work cycle may be used for establishing the operating instructions. Further, information from several work machines may be used for establishing the operating instructions. The plurality of work cycle laps for establishing the operating instructions may be performed by a single work machine, or by different work machines. Thus, established operating instructions may be altered continuously in response to new information. This may be important in cases where the ground conditions changes over time, if the weather changes (fall of rain, snow) etc. Further, established operating instructions may be altered according to individual characteristics of a specific work machine.

According to an alternative or complement method, the operating instructions comprises information with regard to operating the work implement. More specifically, the work implement information regards a work machine hydraulic system information and the method comprises how to operate the hydraulic system (especially the pump(s)). This alternative is particularly useful for work machines, where a substantial power is required for operating the work implement. This is the case in a wheel loader. More specifically, the operating instructions may comprise information regarding power distribution between propelling the vehicle and operating the implement.

According to a further alternative, the memory in the control unit 222 may comprise a plurality of operating instructions, each associated to a specific work cycle.

The control unit 222 may be adapted to automatically recognize which work cycle the work machine is performing by detecting location and direction of the work cycle, and thereafter present the associated operating instructions.

The power source 202 comprises a prime mover in the form of a diesel engine, which generates mechanical power to the wheels and the pump. The prime mover could operate in accordance with any of a variety of thermodynamic cycles, for example an Otto cycle, a Diesel cycle, a Sterling cycle, a Brayton cycle, or a Rankine cycle. In another embodiment, the power source comprises a fuel cell.

The control system 221 may further comprise one or more environment sensors, for example, a pressure sensor or temperature sensor, so as to provide for environmental information that may be influence the operating instructions.

The invention is not in any way limited to the above described embodiments, instead a number of alternatives and modifications are possible without departing from the scope of the following claims.

The invention claimed is:

1. A method for providing an operator of a work machine with operating instructions via an educational interface in a cab of the work machine when the work machine is used in a repeated work cycle, wherein the work cycle comprises a travel path, which defines a movement of the work machine between a loading position and an unloading position at a distance from each other, comprising
   informing the operator, via the education interface, of occurrences along the travel path, which occurrences have an impact on operation of the work machine in an optimum way with regard to a specific parameter, and
   automatically instructing the operator via concrete advice provided through the education interface how to operate the work machine past the occurrences in an optimum way with regard to the specific parameter,
   establishing the occurrences by detecting, via a sensor means, at least one detected operational parameter in a previously performed lap of the work cycle, either by the same work machine or by another work machine, and
   sending a signal regarding the occurrences to the educational interface for use in instructing the operator of the work machine in a later performed specific work cycle.

2. A method according to claim 1, comprising detecting at least one operational parameter during operation of a work machine in the work cycle in question, determining how to operate the work machine in an optimum way in the specific work cycle on the basis of the detected operational parameter and informing the operator of either the same work machine or another work machine in a later performed work cycle correspondingly.

3. A method according to claim 2, comprising associating information about a change in the operational parameter to positions along the work cycle and instructing the operator how to operate the work machine past the positions.

4. A method according to claim 2, comprising detecting at least one machine operational parameter.

5. A method according to claim 2, comprising detecting at least one operational parameter with regard to an operator input to the work machine.

6. A method according to claim 1, the characteristics of the specific work cycle comprises pre-available information of the work cycle in question.

7. A method according to claim 6, wherein the preavailable information of the work cycle comprises a geographical map.

8. A method according to claim 7, wherein the geographical map comprises topographical information.

9. A method according to claim 1, comprising using a satellite based system for establishing a travel path of the work cycle.

10. A method according to claim 1, comprising informing the operator how to operate the work machine in an optimum way with regard to reducing energy consumption.

11. A method for providing an operator of a work machine with operating instructions via an educational interface in a cab of the work machine when the work machine is used in a repeated work cycle, wherein the work cycle comprises a travel path, which defines a movement of the work machine between a loading position and an unloading position at a distance from each other, comprising
   informing the operator of occurrences along, the travel path, which occurrences have an impact on operation of the work machine in an optimum way with regard to a specific parameter,
   automatically instructing the operator via concrete advice how to operate the work machine past the occurrences in an optimum way with regard to the specific parameter, and
   predicting a total energy consumption during a work shift comprising performing the work cycle a plurality of times and informing the operator of the predicted total energy consumption.

12. A method according to claim 1, comprising presenting the operation instructions to the operator in an operator compartment of the vehicle when the operator is seated in the operator compartment.

13. A method according to claim 12, wherein the instruction comprises visual information.

14. A method according to claim 13, comprising presenting the visual information on a screen in the operator compartment.

15. A method according to claim 12, wherein the instruction comprises audio information.

16. A non-transient computer readable medium including a computer program for implementing a method for providing an operator of a work machine with operating instructions via an educational interface in a cab of the work machine when the work machine is used in a repeated work cycle, wherein the work cycle comprises a travel path, which defines a movement of the work machine between a loading position and an unloading position at a distance from each other, comprising
   informing the operator of occurrences along the travel path, which occurrences have an impact on operation of the work machine in an optimum way with regard to a specific parameter, and
   automatically instructing the operator via concrete advice how to operate the work machine past the occurrences in an optimum way with regard to the specific parameter, wherein the occurrences are established based on at least one detected operational parameter in a previously performed lap of the work cycle, either by the same work machine or by another work machine, and are used for instructing the operator of the work machine in a later performed work cycle.

17. A computer programmed with a computer program for implementing a method for providing an operator of a work machine with operating instructions via an educational interface in a cab of the work machine when the work machine is used in a repeated work cycle, wherein the work cycle comprises a travel path, which defines a movement of the work machine between a loading position and an unloading position at a distance from each other, comprising informing the operator of occurrences along the travel path, which occurrences have an impact on operation of the work machine in an optimum way with regard to a specific parameter, and automatically instructing the operator via concrete advice how to operate the work machine past the occurrences in an optimum way with regard to the specific parameter, wherein the occurrences are established based on at least one detected operational parameter in a previously performed lap of the work cycle, either by the same work machine or by another work machine, and are used for instructing the operator of the work machine in a later performed work cycle.

18. A method according to claim 12, wherein the instruction comprises braking and/or gas pedal operation instructions.

19. A method according to claim 12, wherein the instruction comprises steering and/or routing instructions.

20. A method according to claim 12, wherein the instruction comprises gear selection instructions.

21. A method according to claim 12, wherein the instruction comprises work implement operation instructions.

22. A method according to claim 1, wherein the at least one detected operational parameter is any of throttle pedal position, gear selector position, brake pedal position, brake pressure, steering angle, vehicle parts relative inclination, steering wheel or steering lever position, vehicle inclination, vehicle weight, vibrations of the operator seat, vehicle geographical location, vehicle speed, vehicle acceleration, vehicle deceleration, fuel consumption, machine temperature, boom and attachment positions or work implement operation.

23. A method according to claim 2, comprising analyzing the detected operation parameter information and determining if the detected operation parameter information should represent an individual occurrence that is linked to a geographical position of the work cycle.

24. A method for providing an operator of a work machine with operating instructions via an educational interface in a cab of the work machine when the work machine is used in a repeated work cycle, wherein the work cycle comprises a travel path, which defines a movement of the work machine between a loading position and an unloading position at a distance from each other, comprising informing the operator, via, the education interface, of occurrences along the travel path, which occurrences have an impact on operation of the work machine in an optimum way with regard to energy consumption, and automatically instructing the operator via concrete advice provided through the education interface how to operate the work machine past the occurrences in an optimum way with regard to reducing energy consumption.

25. A method according to claim 24, comprising detecting at least one operational parameter during, operation of a work machine in the work cycle in question, determining how to operate the work machine in an optimum way in the specific work cycle on the basis of the detected operational parameter and informing the operator of either the same work machine or another work machine in a later performed work cycle correspondingly.

26. A method according to claim 25, comprising associating information about a change in the operational parameter to positions along the work cycle and instructing the operator how to operate the work machine past the positions.

27. A method according to claim 25, comprising detecting at least one machine operational parameter.

28. A method according to claim 25, comprising detecting at least one operational parameter with regard to an operator input to the work machine.

29. A method according to claim 24, the characteristics of the specific work cycle comprises pre-available information of the work cycle in question.

30. A method according to claim 29, wherein the pre-available information of the work cycle comprises a geographical map.

31. A method according to claim 30, wherein the geographical map comprises topographical information.

32. A method according to claim 24, comprising using, a satellite based system for establishing a travel path of the work cycle.

33. A method according to claim 24, comprising predicting a total energy consumption during a work shift comprising performing the work cycle a plurality of times and informing the operator of the predicted total energy consumption.

34. A method according to claim 24, comprising presenting the operation instructions to the operator in an operator compartment of the vehicle when the operator is seated in the operator compartment.

35. A method according to claim 34, wherein the instruction comprises visual information.

36. A method according to claim 35, comprising presenting the visual information on a screen in the operator compartment.

37. A method according to claim 34, wherein the instruction comprises audio information.

38. A method according to claim 34, wherein the instruction comprises braking and/or acceleration instructions.

39. A method according to claim 34, wherein the instruction comprises steering and/or routing instructions.

40. A method according to claim 34, wherein the instruction comprises gear selection instructions.

41. A method according to claim 34, wherein the instruction comprises work implement instructions.

42. A method according to claim 25, comprising analyzing the detected operation parameter information and determining if the detected operation parameter information should represent an individual occurrence that is linked to a geographical position of the work cycle.

43. A method according to claim 24, wherein the at least one detected operational parameter is any of throttle pedal position, gear selector position, brake pedal position, brake pressure, steering angle, vehicle parts relative inclination, steering wheel or steering lever position, vehicle inclination, vehicle weight, vibrations of the operator seat, vehicle geographical location, vehicle speed, vehicle acceleration, vehicle deceleration, fuel consumption, machine temperature, boom and attachment positions or work implement operation.

* * * * *